June 5, 1962

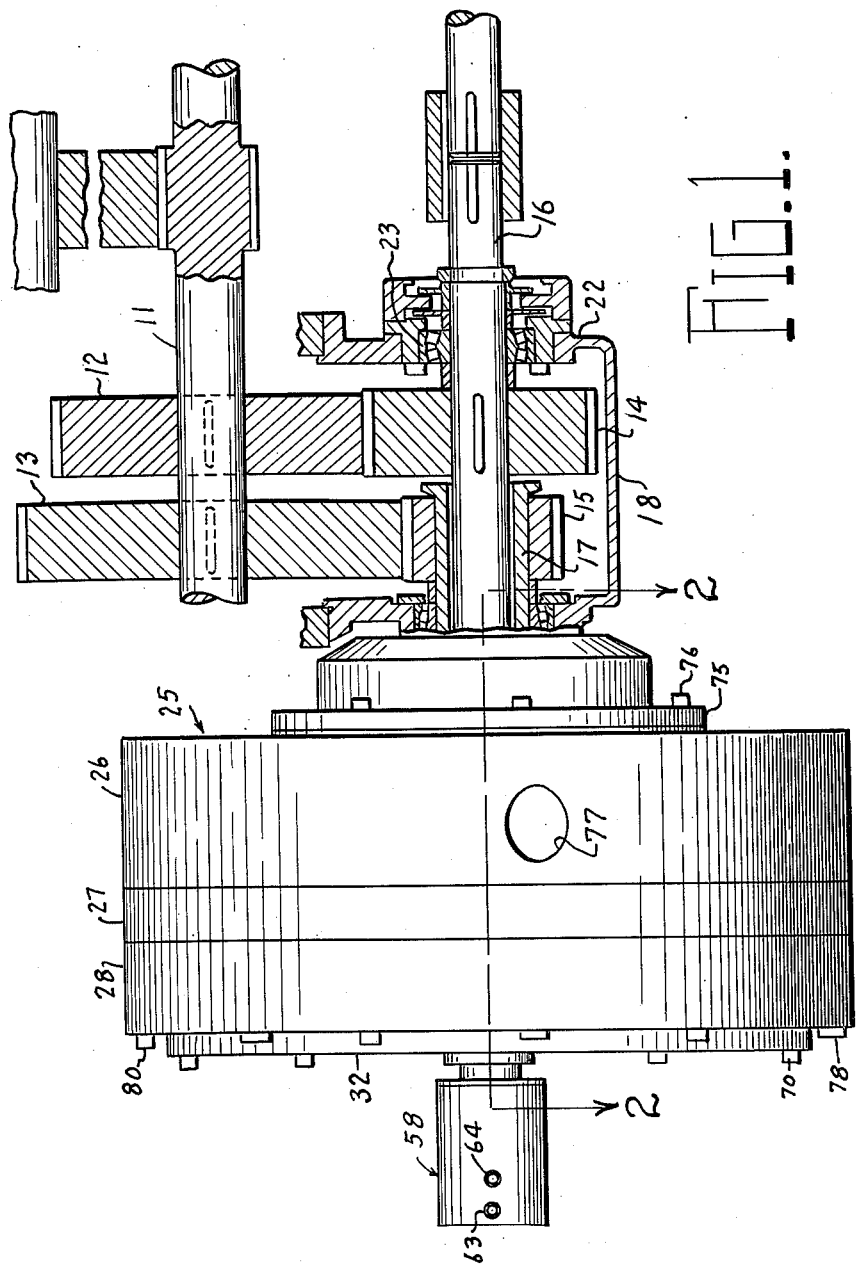

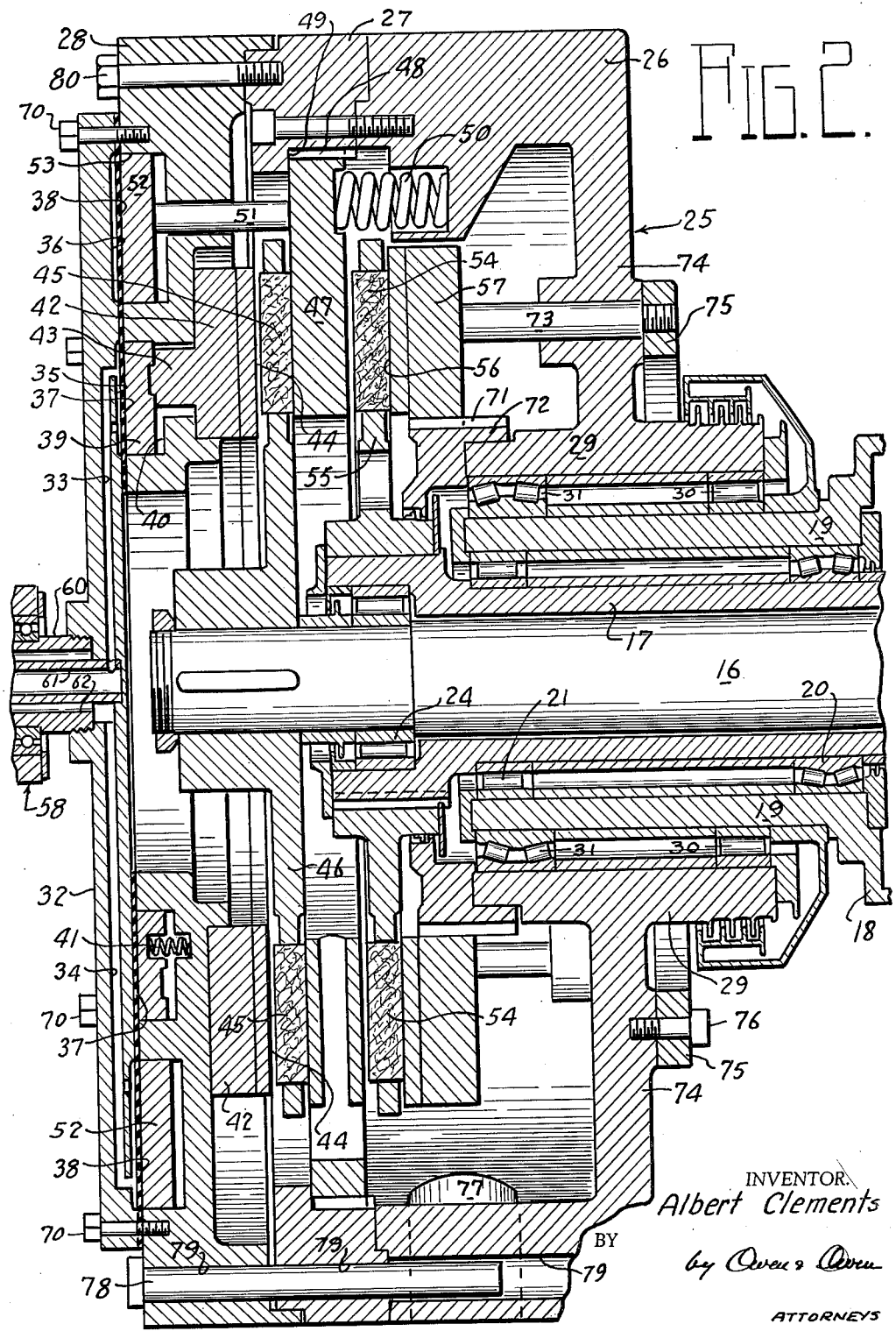

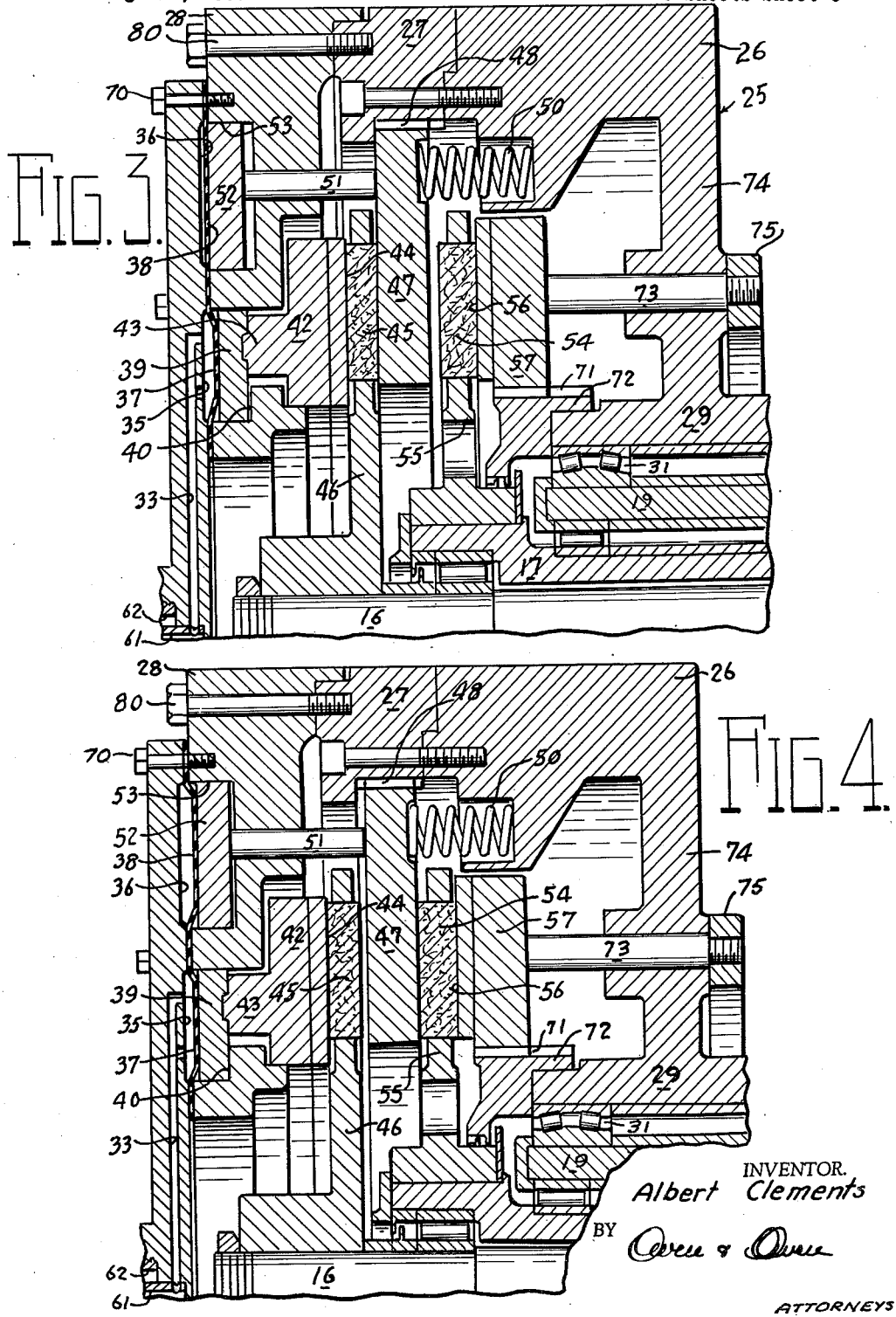

A. CLEMENTS 3,037,602

TWO-SPEED DRIVE FOR PRESSES AND THE LIKE

Filed Aug. 21, 1957

INVENTOR.
Albert Clements

BY

ATTORNEYS

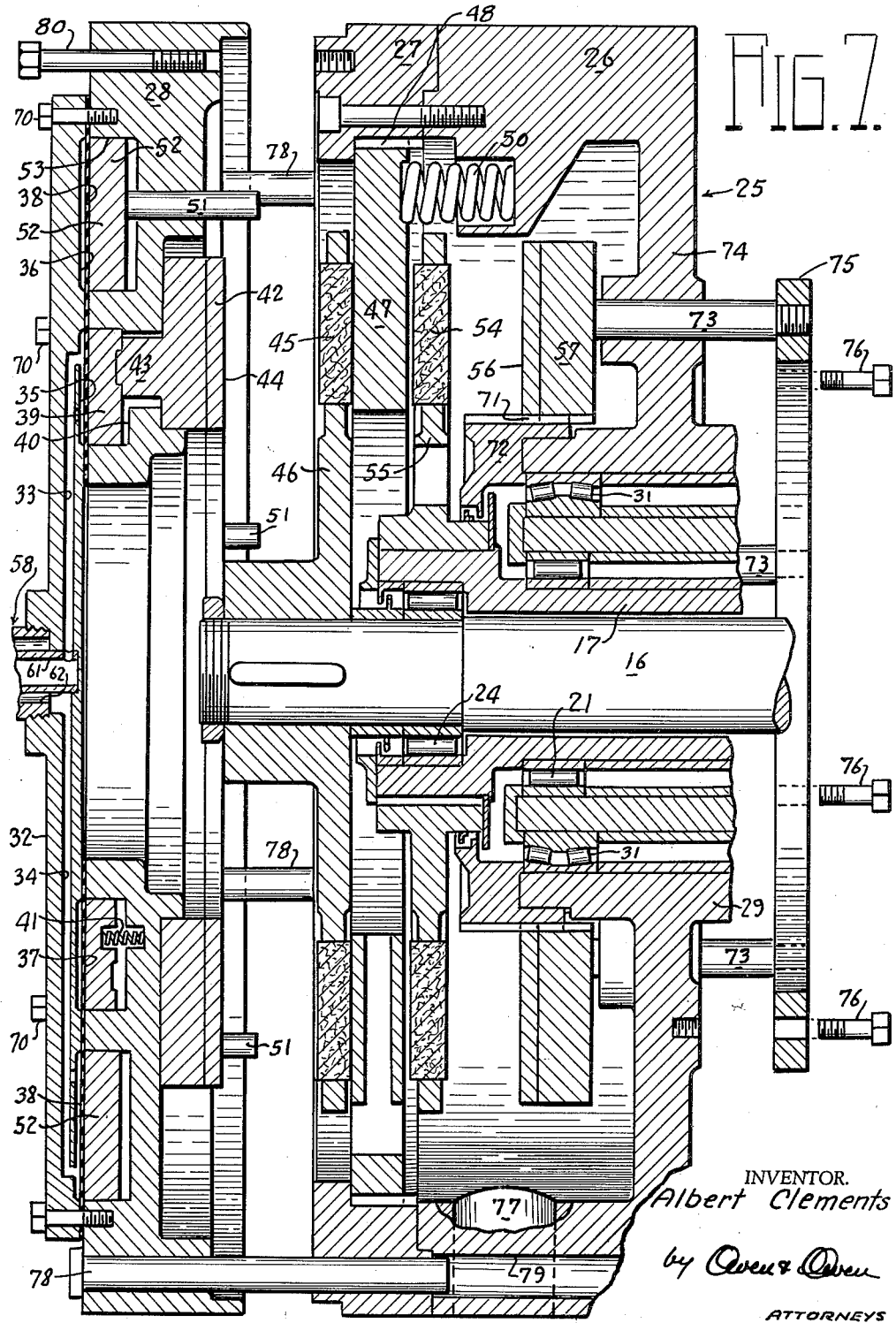

United States Patent Office 3,037,602
Patented June 5, 1962

3,037,602
TWO-SPEED DRIVE FOR PRESSES AND THE LIKE
Albert Clements, Hamilton, Ohio, assignor to Baldwin-Lima-Hamilton Corporation, Hamilton, Ohio, a corporation of Pennsylvania
Filed Aug. 21, 1957, Ser. No. 679,374
5 Claims. (Cl. 192—87)

This invention pertains to a two-speed drive mechanism and more particularly to a drive incorporating two fluid or pneumatically operated clutches in which power is transmitted through members which are operatively engaged with other members by being moved in the same directions.

Two-speed drives are widely used with large power presses. During an initial portion of a power stroke of a press, a fast speed is preferred to move an upper die quickly down nearly to the point of closure against a lower die. A slow speed is then used during a metal forming portion of the stroke when the dies are closed and a considerable force is required. After the metal forming operation, a fast return stroke is preferred to hasten completion of the cycle.

In this type of operation, fast advance, slow draw or form, and fast return, more productive strokes per minute can be had without increasing the working speed of the press. The working speed of the press is limited by the capacity of the material to be drawn or deformed without tearing.

To achieve this type of power stroke, two separate clutches are commonly employed which are engaged by air cylinders, solenoids, or other actuating means. Because of wear or misalignment, for example of the actuating means, synchronism of the engagement of the clutches is destroyed and the operation of the clutches either overlaps or is spaced so that there is a time lag therebetween. In the former case, one of the clutches must slip, causing that clutch face to heat up and wear excessively. In the latter case, the machinery being driven slows down or even stops during the time lag and the second clutch must then engage and drive the slowly moving, or stationary parts which causes slippage and rapid wear and heating on the clutch faces during the initial portion of the engagement.

Two-speed drives have numerous other applications in which these and similar problems arise.

The present invention provides a two-speed drive in which two clutch members are independently or sequentially engaged with no possibility of the engagements overlapping or having a significant time lag therebetween. The clutch mechanisms are preferably fluid operated which provides smoother operation, compactness, and simplicity. Further, in the present invention the fluid pressure is applied, and the clutch members move, in the same direction.

According to one important feature of the invention the parts are arranged to enable easy access to the clutch members for maintenance or inspection without requiring dismantling of the clutches. The fluid conduits, diaphragms, and packing are also easily accessible with the new drive of the present invention.

Thus, one object of the invention is to provide a two-speed drive which assures proper sequential engagement of clutch members without requiring critical timing.

Another object of the invention is to provide a two-speed drive in which clutch members are engageable by movement in the same direction so that one clutch is automatically disengaged in the same motion that causes engagement of the other.

A further object is to provide a drive in which all wearing parts are easily accessible for replacement or inspection.

Other objects of the invention will be apparent from the following detailed description of a particular embodiment thereof, reference being made to the accompanying drawings, in which—

FIGURE 1 is a side view, partially in cross-section, of a gear train and a drive embodying the invention;

FIG. 2 is a cross-sectional view taken on the line 2—2 of FIG. 1;

FIG. 3 is a fragmentary cross-sectional view of the drive of FIG. 2 showing a clutch therein in operative engagement;

FIG. 4 is a fragmentary cross-sectional view similar to FIG. 3 but showing another clutch therein in operative engagement;

FIG. 7 is a cross-sectional view similar to FIG. 2 but showing portions thereof displaced to enable easy access for the replacement of wearing parts.

Figure 5:
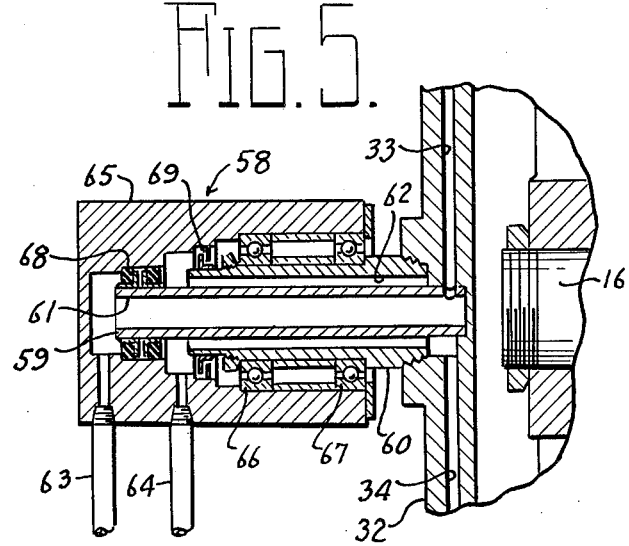
FIG. 5 is a detailed, cross-sectional view of a fluid coupling or inlet which may be employed with the drive.

Briefly, a drive according to the invention comprises a driving body or housing with means to cause clutching engagement between the housing and either of two eccentric shafts. Each of the shafts carries a clutch spider, and the housing carries an axially movable clutch ring between the spiders. Means are provided to force the spider of one shaft into clutching engagement against the axially movable clutch ring for one drive, and separate means are provided to force the axially movable clutch ring into clutching engagement with the other spider for the second drive. Each of these last means is preferably a fluid operated cylinder, and movement of the axially movable clutch ring out of engagement with the first spider and into engagement with the second spider causes the two drives to take place sequentially without possibility of overlapping.

A specific embodiment of the invention is shown in FIGS. 1 and 2. A shaft 11 (FIG. 1) drives a power press or other apparatus through appropriate gears or other mechanism. The shaft 11 is connected to a high speed gear 12 and a low speed gear 13 which are respectively operatively engaged with high speed and low speed pinions 14 and 15. The pinion 14 is affixed to a shaft 16, only a portion of which is shown. The other end of this shaft may be free or connected to a brake or another gear. The pinion 15 is connected to an annular shaft 17 which is concentrically located about the shaft 16. The shafts 16 and 17 are supported by an appropriate support bracket 18, with the shaft 17 supported in a tubular portion 19 (FIG. 2) of the bracket 18 by suitable anti-friction bearings 20 and 21 while the shaft 16 is supported in an outer flanged portion 22 (FIG. 1) of the bracket 18 and in the shaft 17 by bearings 23 and 24.

A drive housing 25 may be provided with suitable grooves for V-belts or with other means by which the housing 25 can be driven by a drive motor (not shown). The housing 25 comprises inner, center and outer sections, 26, 27 and 28. The section 28 is separable from the section 27 to provide easy access to the interior of the housing 25 as will be more fully discussed subsequently. Sections 26 and 27 are separable principally for easier manufacture. The inner section 26 has a flange 29 concentrically located with respect to the tubular portion 19 of the bracket 18 and is rotatably supported thereby through bearings 30 and 31.

Figure 6:
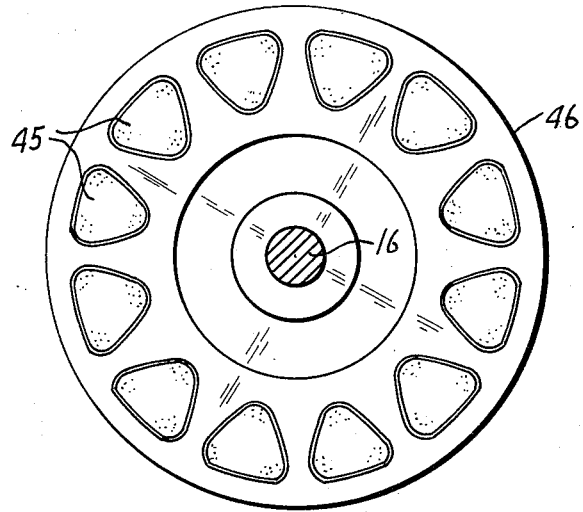
FIG. 6 is a detailed view of a portion of a clutch spider used with the drive of FIGS. 1–4.

A circular plate 32 is attached to the outer section 28 and carries or contains fluid passages 33 and 34 which communicate with inner and outer annular recesses 35 and 36 and inner and outer annular diaphragms 37 and 38, respectively. An inner, annular piston 39, located in an inner, annular recess 40 in the outer housing section 28, is held outwardly against the inner diaphragm 37 by springs 41, and is moved inwardly against the springs when sufficient pressure is exerted on the diaphragm 37. A forward clutch member or ring 42 is operatively connected to the inner piston 39 thorugh stems 43 and has a wear face 44 which is engageable with friction segments 45 (see also FIG. 6) of a front spider 46 attached to the shaft 16. When the forward clutch ring 42 moves inwardly (see FIG. 3), the segments 45 are clamped in clutching engagement between the wear face 44 of the clutch ring 42 and a slidable, center clutch member or ring 47 which enables a maximum surface of the segments 45 to be contacted. The slidable ring 47 is splined at 48 to the center housing section 27 and is urged to a position against a shoulder 49 of the center section 27 by heavy springs 50. When the clutch ring 42 is moved inwardly by reason of air pressure behind the annular piston 39, a drive is established from the housing through the ring 47 and the forward clutch disk 46 to the shaft 16.

The slidable center ring 47 bears against actuating pins 51 which also engage an outer annular piston 52 in an outer annular recess 53. The piston 52 is moved inwardly when sufficient fluid pressure is applied to the diaphragm through passage 34 to overcome the force of the springs 50. The slidable ring 47 is then moved away from the forward spider 46 (see FIG. 4) and into engagement with friction segments 54 of a second or rear spider 55 connected to the outer concentric shaft 17. The friction segments 54 which may be normally in slight, slidable contact with a wear face 56 of a rear clutch ring 57 are thus moved into clutching engagement with the ring 47 and the wear face 56 and a drive connection is established between the housing 25 and the shaft 17.

The area of the outer diaphragm 38 is preferably larger than that of the inner diaphragm 37 since the force exerted on the diaphragm 38 must be large enough to overcome the force of the heavy springs 50 while the force exerted on the diaphragm 37 must be less than the force of the springs 50. With this design, the shaft 11 can be instantly changed from low speed rotation to high speed rotation even with fluid pressure being constantly applied to the inner diaphragm 37. Thus with pressure on the diaphragm 37, the inner piston 39 is moved to its inner position so that the front spider 46 is engaged between the wear face 44 of the forward clutch ring 42 and the slidable center ring 47. If equal fluid pressure is then applied to the outer diaphragm 38 so that the force created exceeds the force of the heavy springs 50, the slidable center ring 47 is moved inwardly to engage the friction segments 54 of the rear spider 55 and at the same time is moved away from the friction segments 45 of the front spider 46. These segments 45 will then be in only slight, slidable, nondriving contact with the rear face 44 of the forward clutch ring 42. As a safety measure, the movement of the inner piston 39 is limited by the inner recess 40 to prevent any possibility of the forward ring 42 being moved inwardly far enough to engage both spiders 46 and 55. The engagement of the rear spider 55 by the slidable center ring 47 is substantially instantaneous, the time interval between the disengagement of the front spider 46 and the engagement of the rear spider 55 being only the time required for the slidable center ring 47 to move a fraction of an inch to its inner position. No critical timing is necessary.

The clutch members are preferably fluid operated. Fluid may be supplied to the passages 33 and 34 through a conventional rotatable fluid coupling 58 (see FIG. 5). This coupling consists of two concentric tubes 59 and 60 forming passages 61 and 62 which connect fluid inlets 63 and 64 to the passages 33 and 34. The inlets 63 and 64 are located in a stationary casing 65 which is supported by the outer tube 60 through bearings 66 and 67. The passages 61 and 62 are separated by an appropriate seal 68 and the passage 62 is separated from the bearings 66 and 67 by a seal 69. The inlets 63 and 64 may be connected to piping or tubing in which a suitable valve is located to control the flow of fluid to the inlets.

The concurrent direction of forces applied to the clutch members enables all of the fluid conduits and controls to be at one end of the housing 25 for easy accessibility. Thus, the diaphragms 37 and 38 and the pistons 39 and 52 may be repaired or inspected simply by removing machine screws 70 which attach the circular plate 32 to the outer housing section 28. The coupling 58 provides easy access to the fluid inlets also. In addition, the arrangement further provides maximum compactness and simplicity of the clutch.

In accordance with one of the principal advantages of the present invention, the friction segments of the two-clutch spiders are easily accessible for replacement or inspection. For the purpose of gaining access to the rear spider 46 the rear clutch ring 57 is splined at 71 to a member 72 attached to the flange 29 of the rear housing section 26. The rear clutch ring 57 is maintained in a fixed position closely adjacent the rear spider by a plurality of pins 73 which constitute holding means for the ring 57. The pins 73 extend through a wall 74 of the rear housing section 26 and are attached to a connecting ring 75 which is a releasing means for releasing the holding means. The connecting ring is, in turn, attached to the wall 74 by a plurality of tap bolts 76 which are unscrewed to release the connecting ring 75 from the wall 74. The ring 75 is then pulled outwardly (see FIG. 7) which enables the rear clutch ring 57 to be moved along the spline 71 and away from the spider 55 which carries the friction segments 54. One or more access openings 77 are provided in the section 26 through which the ring 57 may be moved back and the segments 54 exposed for removal or inspection. Thus, the segments 54 can be replaced in a matter of minutes since it is only necessary to slip new pieces into the holes in the spider 55 and to reassemble the ring 75 and its fastening bolts.

The segments 45 of the front spider 46 are also easily accessible. For this purpose, a plurality of guide pins 78 are provided which extend partially through holes 79 in the three sections 26, 27 and 28. Tap bolts 80 are removed and the outer section 28 with the plate 32 extended axially outwardly to separate the forward clutch ring 42 from the front spider 46 and the segments 45. This also leaves a gap between the center and outer sections 27 and 28. The segments 45 are thus accessible through the gap and may then be easily inspected or replaced. The guide pins 78 are left in position in a portion of the holes 79 in the center section 27 to serve as means for temporarily aligning and supporting the outer section 28 with the other sections of the clutch.

The operation of the present invention is believed to be clear from the above description of a preferred embodiment thereof. It will be seen that the invention provides a simple and efficient clutching mechanism for a two-speed drive that does not require precise timing for its operation and in which the clutches cannot possibly overlap in their operation, nor can they be simultaneously disconnected except by a positive act of the operator or an automatic operating mechanism. It will also be seen that the invention provides a drive mechanism that is easily repaired and in which the wearing friction segments may be replaced in the clutch elements without disassembling the unit as is required in most clutches with which I am familiar.

The foregoing description and drawings have been intended to serve in an illustrative and not a limiting sense, the scope of the invention being determined only by the claims appended hereto.

What I claim is:

1. A two-speed drive comprising a first shaft, a second shaft concentrically located with respect to said first shaft, a front clutch spider attached to said first shaft, a rear clutch spider attached to said second shaft and in spaced relationship to said front spider, a housing enclosing said spiders and portions of said shafts, a forward clutch ring within said housing and slidably supported thereby adjacent a face of said front spider, said forward clutch ring having a first position out of clutching engagement with said front clutch spider and a second position in clutching engagement with said front clutch spider, a slidable clutch ring within said housing and slidably supported thereby at least partially between said spiders, said slidable clutch ring having only two positions, a first one out of clutching engagement with either of said spiders when said forward clutch ring is in its first position, and a second one in clutching engagement with the adjacent face of said rear clutch spider and out of engagement with the adjacent face of said front spider, means for moving said forward ring from its first position to its second position in clutching engagement with the adjacent face of said front spider, means for maintaining said slidable clutch ring in its first position while said forward clutch ring is moved from its first to its second position, and means for moving said slidable ring from its first position to its second position in clutching engagement with the corresponding face of said rear spider and out of clutching engagement with said front spider only when said forward clutch ring is in its second position, whereby only one of said spiders can be engaged by said clutch rings at any given time.

2. A two-speed drive comprising a first shaft, a second shaft concentrically located with respect to said first shaft, a front spider attached to said first shaft, a rear spider attached to said second shaft and in spaced relationship to said front spider, a rotatable, driven housing enclosing said spiders and portions of said shafts, a forward clutch ring within said housing and slidably supported thereby adjacent a face of said front spider, said forward clutch ring having a first position out of clutching engagement with said front spider and a second position in clutching engagement with said front spider, a slidable clutch ring within said housing and slidably supported thereby at least partially between said spiders, said clutch ring having two positions, a first one out of clutching engagement with either of said spiders when said forward ring is in its first position, and a second one in clutching engagement with the adjacent face of said rear spider and out of clutching engagement with the adjacent face of said front spider, a rear clutch ring attached to said housing, immovably positioned with respect thereto when said drive is in operation, and located adjacent the face of said rear spider opposite the face nearer said slidable ring, means for moving said forward ring from its first position toward the adjacent face of said front spider to its second position to engage said front spider between said forward ring and said slidable ring, and means for moving said slidable ring from its first position toward the corresponding face of said rear spider to its second position to engage said rear spider between said rear clutch ring and said slidable ring and to disengage said front spider regardless of which position said forward clutch ring is in.

3. A two-speed drive comprising a first shaft, a second shaft concentrically located with respect to said first shaft, a front spider attached to said first shaft, a rear spider attached to said second shaft and in spaced relationship to said front spider, a rotatable, driven housing enclosing said spiders and portions of said shafts, a forward clutch ring within said housing and slidably supported thereby adjacent a face of said front spider, a slidable clutch ring within said housing and slidably supported thereby at least partially between said spiders, a rear clutch ring attached to said housing and located adjacent the face of said rear spider opposite the face nearer said slidable ring, an inner fluid actuated piston located in an end wall of said housing and operatively connected to said forward ring, an outer fluid actuated piston located in the same end wall and operatively connected to said slidable ring, means for applying pressure on said inner piston to move said forward ring toward the adjacent face of said front spider to engage said front spider between said forward ring and said slidable ring only when said outer piston is unactuated, and means for applying fluid pressure to said outer piston to move said slidable ring toward the corresponding face of said rear spider to engage said rear spider between said rear ring and said slidable ring and to disengage said front spider regardless of the position of said forward ring.

4. A two-speed drive comprising a first shaft, a second shaft concentrically located with respect to said first shaft, a front spider attached to said first shaft, a rear spider attached to said second shaft and in spaced relationship to said front spider, a rotatable, driven housing enclosing said spiders and portions of said shafts, a forward clutch ring within said housing and slidably supported thereby adjacent a face of said front spider, a slidable clutch ring within said housing and slidably supported thereby at least partially between said spiders, spring means for maintaining said slidable ring closely adjacent the face of said front spider opposite said forward ring, a rear clutch ring attached to said housing and adjacent the face of said rear spider opposite the face nearer said slidable ring, an inner piston located in an end wall of said housing and operatively connected to said forward ring, an outer piston located in the same end wall and operatively connected to said slidable ring, means for applying a first force to said inner piston to move said forward ring toward the adjacent face of said front spider to engage said front spider between said forward ring and said slidable ring, said first force being smaller than the force exerted by said spring means, and means for applying a second force to said outer piston to move said slidable ring toward the corresponding face of said rear spider to engage said rear spider between said rear ring and said slidable ring and to disengage said front spider, said second force being greater than the force exerted by said spring means whereby said slidable ring is moved out of clutching engagement with said front spider and into clutching engagement with said rear spider.

5. A two-speed drive comprising a first shaft, a second shaft concentrically located with respect to said first shaft, a front spider attached to said first shaft, a rear spider attached to said second shaft and in spaced relationship to said front spider, a plurality of front friction segments loosely held in said front spider, a plurality of rear friction segments loosely held in said rear spider, a rotatable, driven housing enclosing said spiders and portions of said shafts, a forward clutch ring within said housing and slidably supported thereby adjacent faces of said front friction segments, a slidable clutch ring within said housing and slidably supported thereby between said spiders, spring means for maintaining said slidable ring closely adjacent the faces of said front segments opposite said forward ring, a rear clutch ring attached to said housing and closely adjacent the faces of said rear segments opposite the faces nearer said slidable ring, an inner piston located in an end wall of said housing and operatively connected to said forward ring, an outer piston located in the same end wall and operatively connected to said slidable ring, means for applying a first force on said inner piston to move said forward ring toward the adjacent faces of said front friction segments to engage said front friction segments between said forward ring and said slidable ring, said first force being smaller than the force exerted by said spring means, and means for applying a second force to said outer piston to move said slidable ring toward the adjacent faces of said rear segments to engage said rear segments between said rear ring and said slidable ring and to disengage said first segments of said front spider, said second force being greater than the force exerted by said spring means whereby said slidable ring is moved out of clutching engagement with said front spider and into clutching engagement with said rear spider.

References Cited in the file of this patent

UNITED STATES PATENTS

| | | |
|---|---|---|
| 1,579,540 | Jackson | Apr. 6, 1926 |
| 1,821,127 | Vandeveer | Sept. 1, 1931 |
| 1,996,915 | Fleischel | Apr. 9, 1935 |
| 2,113,088 | Jonsson | Apr. 5, 1938 |
| 2,259,933 | Holloway | Oct. 21, 1941 |
| 2,371,804 | Cooke | Mar. 20, 1945 |
| 2,472,750 | Lavash | June 7, 1949 |
| 2,485,688 | Banker | Oct. 25, 1949 |
| 2,551,939 | Gerst | May 8, 1951 |
| 2,584,191 | Danly | Feb. 5, 1952 |
| 2,636,585 | Livermore | Apr. 28, 1953 |
| 2,642,168 | Black | June 16, 1953 |
| 2,757,557 | Hoffman | Aug. 7, 1956 |
| 2,822,071 | Hautzenroede | Feb. 4, 1958 |

FOREIGN PATENTS

| | | |
|---|---|---|
| 622,932 | Great Britain | May 10, 1949 |
| 840,652 | Germany | June 3, 1952 |
| 1,015,291 | France | July 2, 1952 |